(12) United States Patent
Banerjee et al.

(10) Patent No.: US 11,228,053 B2
(45) Date of Patent: Jan. 18, 2022

(54) POUCH CELL BATTERY INCLUDING AN ION EXCHANGE MEMBRANE

(71) Applicant: Nextech Batteries, Inc., Reno, NV (US)

(72) Inventors: Shoibal Banerjee, Reno, NV (US); Zachary Favors, Reno, NV (US); Bhargav Bhamwala, Sparks, NV (US)

(73) Assignee: Nextech Batteries, Inc., Reno, NV (US)

( * ) Notice: Subject to any disclaimer, the term of this patent is extended or adjusted under 35 U.S.C. 154(b) by 419 days.

(21) Appl. No.: 16/416,147

(22) Filed: May 17, 2019

(65) Prior Publication Data

US 2020/0365934 A1   Nov. 19, 2020

(51) Int. Cl.
*H01M 10/0525* (2010.01)
*H01M 10/647* (2014.01)
*H01M 10/04* (2006.01)

(52) U.S. Cl.
CPC ..... *H01M 10/0525* (2013.01); *H01M 10/049* (2013.01); *H01M 10/0459* (2013.01); *H01M 10/647* (2015.04)

(58) Field of Classification Search
None
See application file for complete search history.

(56) References Cited

U.S. PATENT DOCUMENTS

| | | | |
|---|---|---|---|
| 2009/0136834 A1* | 5/2009 | Coowar | H01M 10/052 429/127 |
| 2016/0204441 A1* | 7/2016 | Kogan | H01M 8/188 429/7 |
| 2016/0285135 A1* | 9/2016 | Tsukahara | H01M 10/399 |

* cited by examiner

*Primary Examiner* — Christopher P Domone
(74) *Attorney, Agent, or Firm* — Gutwein Law; Tyler B. Droste

(57) ABSTRACT

A battery comprising a cathode and the anode compartments can be completely isolated from each other and thus preventing migration of soluble polysulfide anions from cathode to anode compartment by a novel cell design that involves enclosing either or both the cathode or the anode in sealed cation exchange polymer pouch prior to stacking and assembling the pouch cell.

18 Claims, 10 Drawing Sheets

POUCH CELL BATTERY INCLUDING AN ION EXCHANGE MEMBRANE

FIELD OF THE INVENTION

This invention relates generally to pouch cell battery cell design and construction. In one aspect, the invention relates to Li—S cell pouches utilizing cation exchange membranes as separators thus significantly improve the cycle life of Li—S batteries.

BACKGROUND

In the battery industry, there is an increasing need for battery solutions with high energy density and high capacity to provide an energy source for the demands of personal electronic devices, electric vehicles, and large-scale energy storage. A battery based on Li—S chemistry offers an attractive technology that meets the two most pressing issues for electric-based transportation, the needs for low cost and high specific energy density. Li—S battery technology has been the subject of intensive research and development both in academia and in industry due to its high theoretical specific energy of 2600 Wh/kg as well as the low cost of sulfur.

The theoretical capacity of sulfur via two-electron reduction (S+2Li++2e−⇌$Li_2S$), is 1672 mAh/g (elemental sulfur is reduced to $S^{-2}$ anion). The discharge process starts from a crown S8 molecule and proceeds though reduction to higher-order polysulfide anions ($Li_2S_8$, $Li_2S_6$) at a high voltage plateau (2.3-2.4 V), followed by further reduction to lower-order polysulfides ($Li_2S_4$, $Li_2S_2$) at a low voltage plateau (2.1 V), and terminates with the $Li_2S$ product. During the charge process, $Li_2S$ is oxidized back to $S_8$ through the intermediate polysulfide anions $S_x$. The $S_x$ polysulfides generated at the cathode are soluble in the electrolyte and can migrate to the anode where they react with the lithium electrode in a parasitic fashion to generate lower-order polysulfides, which diffuse back to the cathode and regenerate the higher forms of polysulfide. Y. V. Mikhaylik & J. R. Akridge, "Polysulfide Shuttle Study in the Li/S Battery System," *J. Electrochem. Soc.*, 151, A1969-A1976 (2004) and J. R. Akridge, Y. V. Mikhaylik & N. White, "Li/S fundamental chemistry and application to high-performance rechargeable batteries," *Solid State Ionics*, 175, 243-245 (2005) describe this shuttle effect, which leads to decreased sulfur utilization, self-discharge, poor ability to repeatedly cycle through oxidation and reduction, and reduced columbic efficiency of the battery. The insulating nature of S and $Li_2S$ results in poor electrode rechargeability and limited rate capability. In addition, an 80% volume expansion takes place during discharge.

To overcome this shuttle effect in Li—S batteries, various strategies have been implemented including the confinement within micro-pores hollow sphere structures, conducting polymer coatings, and limitation of sulfur by covalent bonds within polymers, polysulfide reservoirs, have been proposed to limit the diffusion of polysulfides. However, the use of liquid-electrolyte integrated porous separator was not able to fully address the polysulfide diffusion issue. Ion-exchange polymer membranes have been used in various industry processes. One well-known example is the Nafion® ionomer thin film, a copolymer of tetrafluoroethylene and perfluoro-vinyl-ether, which has been widely used in the proton exchange membrane fuel cells (PEMFCs) and chlorine-caustic soda industries due to its excellent stability and high proton conductivity. When turning H+ to Li+ form, the Nafion® polymer material has the ability to transfer Li+. The ionic conductivity and swelling behavior of lithiated Nafion® ionomer, as well as its application in Li-ion batteries with metal oxide cathodes have been previously investigated. Recently, two approaches involving the use of either a Nafion® modified porous Celgard separator or a lithiated free standing Nafion® ionomer film have been explored with Li—S batteries and has shown some improvement for suppressing the polysulfide diffusion.

Unfortunately, with conventional lithium-sulfur batteries, the sulfur cathode discharge products, polysulfides, may migrate through the separator and react on a surface of the anode, causing further performance and capacity degradation. Various attempts have been made to address these issues with conventional lithium-sulfur batteries. One technique includes modifying the electrolyte to attempt to provide additional sulfur for the electrochemical reaction, and another technique includes providing a protective sheath around the anode. Neither approach has been completely successful. Modified electrolyte solutions fail to completely control polysulfide solubility, and protective lithium anode layers have other undesirable effects on the electrochemical characteristics of the battery. Accordingly, improved lithium-sulfur batteries and components thereof are desired.

There exists a need to for an improved battery construction to prevent migration of soluble polysulfide anions from the cathode to the anode to better improve the rechargeability and capability of a pouch cell battery. Furthermore, there exists a need for a pouch cell design that enables the effective use cation exchange membrane-based separators by isolating the cathode and anode compartments in a way that prevents the migration of the polysulfide anions around the edges of the separator.

BRIEF SUMMARY OF THE INVENTION

In one aspect, this disclosure is related to a pouch cell battery comprising a cathode and the anode compartments that can be completely isolated from each other and thus preventing migration of soluble polysulfide anions from cathode to anode compartment by a novel cell design that involves enclosing either or both the cathode or the anode in sealed cation exchange polymer pouch prior to stacking and assembling the pouch cell.

In another aspect, this disclosure is related to a pouch cell battery construction including a cation exchange membrane configured to isolate the cathode and anode from one another to reduce and/or eliminate the formation and migration of soluble polysulfides in the cathode compartment to around the edges of the cation exchange membrane and thereby reacting with the lithium anode rendering the separator functionally ineffective.

In yet another aspect, this disclosure is related to a method of manufacturing a pouch cell battery configured to improve stability by first preparing a pouch cell packaging having four edges, wherein three of the four edges of the bag are sealed. A suitable cathode and anode can each be prepared. The cathode and anode can each optional include a separator. An ion exchange membrane can be provided at configured to allow for the anode or cathode to be placed within the membrane and sealed. The components along with an electrolyte can then be placed within a pouch cell packaging material and sealed.

In yet another aspect, this disclosure is related to a pouch cell battery comprising a cathode containing sulfur, an anode containing lithium, a separator, an ion exchange membrane configured to inhibit the crossover of ions in the battery, wherein the anode is fully encapsulated within the ion exchange membrane, an electrolyte, pouch cell packaging material configured to house the cathode, anode, separator, ion exchange membrane, and electrolyte, and a first electrode communicatively coupled to the cathode and a second electrode communicatively coupled to the anode.

In yet another aspect, this disclosure is related to a pouch cell battery comprising a carbon-based cathode, an anode containing lithium, a separator, an ion exchange membrane configured to inhibit the crossover of ions in the battery, wherein the anode is fully encapsulated within the ion exchange membrane, an electrolyte, pouch cell packaging material configured to house the cathode, anode, separator, ion exchange membrane, and electrolyte, and a first electrode communicatively coupled to the cathode and a second electrode communicatively coupled to the anode.

The invention now will be described more fully hereinafter with reference to the accompanying drawings, which are intended to be read in conjunction with both this summary, the detailed description and any preferred and/or particular embodiments specifically discussed or otherwise disclosed. This invention may, however, be embodied in many different forms and should not be construed as limited to the embodiments set forth herein; rather, these embodiments are provided by way of illustration only and so that this disclosure will be thorough, complete and will fully convey the full scope of the invention to those skilled in the art.

BRIEF DESCRIPTION OF THE DRAWINGS

The features and advantages of this disclosure, and the manner of attaining them, will be more apparent and better understood by reference to the following descriptions of the disclosed system and process, taken in conjunction with the accompanying drawings, wherein.

DETAILED DESCRIPTION OF THE INVENTION

Figure 1:
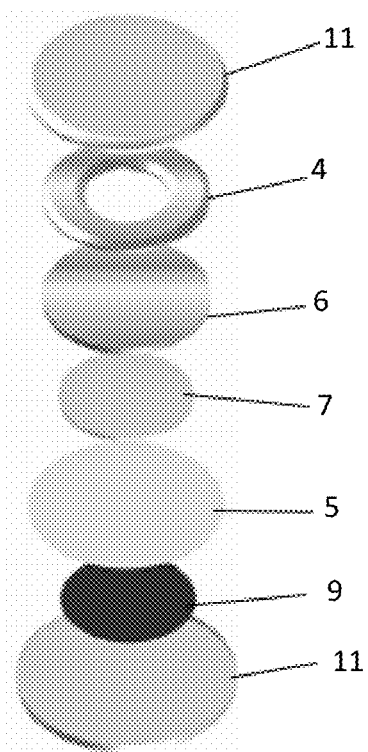
FIG. 1 is an exploded view of an exemplary embodiment of a coin cell configuration of the Li—S battery of the present disclosure.

The following detailed description includes references to the accompanying drawings, which forms a part of the detailed description. The drawings show, by way of illustration, specific embodiments in which the invention may be practiced. These embodiments, which are also referred to herein as "examples," are described in enough detail to enable those skilled in the art to practice the invention. The embodiments may be combined, other embodiments may be utilized, or structural, and logical changes may be made without departing from the scope of the present invention. The following detailed description is, therefore, not to be taken in a limiting sense.

Before the present invention of this disclosure is described in such detail, however, it is to be understood that this invention is not limited to particular variations set forth and may, of course, vary. Various changes may be made to the invention described and equivalents may be substituted without departing from the true spirit and scope of the invention. In addition, many modifications may be made to adapt a particular situation, material, composition of matter, process, process act(s) or step(s), to the objective(s), spirit or scope of the present invention. All such modifications are intended to be within the scope of the disclosure made herein.

Unless otherwise indicated, the words and phrases presented in this document have their ordinary meanings to one of skill in the art. Such ordinary meanings can be obtained by reference to their use in the art and by reference to general and scientific dictionaries.

References in the specification to "one embodiment" indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The following explanations of certain terms are meant to be illustrative rather than exhaustive. These terms have their ordinary meanings given by usage in the art and in addition include the following explanations.

As used herein, the term "and/or" refers to any one of the items, any combination of the items, or all of the items with which this term is associated.

As used herein, the singular forms "a," "an," and "the" include plural reference unless the context clearly dictates otherwise.

As used herein, the terms "include," "for example," "such as," and the like are used illustratively and are not intended to limit the present invention.

As used herein, the terms "preferred" and "preferably" refer to embodiments of the invention that may afford certain benefits, under certain circumstances. However, other embodiments may also be preferred, under the same or other circumstances.

Furthermore, the recitation of one or more preferred embodiments does not imply that other embodiments are not useful and is not intended to exclude other embodiments from the scope of the invention.

As used herein, the terms "front," "back," "rear," "upper," "lower," "right," and "left" in this description are merely used to identify the various elements as they are oriented in the FIGS, with "front," "back," and "rear" being relative to the apparatus. These terms are not meant to limit the elements that they describe, as the various elements may be oriented differently in various applications.

As used herein, the term "coupled" means the joining of two members directly or indirectly to one another. Such joining may be stationary in nature or movable in nature. Such joining may be achieved with the two members or the two members and any additional intermediate members being integrally formed as a single unitary body with one another or with the two members or the two members and any additional intermediate members being attached to one another. Such joining may be permanent in nature or alternatively may be removable or releasable in nature.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure.

The present invention provides an improved lithium-sulfur battery, a cathode for a lithium-sulfur battery, and methods of forming the battery. The ways in which the present invention addresses the drawbacks of prior-art batteries will be discussed in greater detail below. In general, the batteries of the present invention can increase the energy density and specific energy, compared to traditional lithium-sulfur batteries. A detailed description of exemplary, non-limiting embodiments follows.

FIG. 1 illustrates a coin cell battery and the individual elements that form a coin cell assembly. The coin cell assembly can include a coin cell lid 1, which can include a polymeric gasket 3 around the edge and can be configured to press down on the cation exchange membrane 5. This can provide a seal that isolates the anode 7 compartment from the cathode 9 compartment and can prevent soluble polysulfides that may be generated in the cathode compartment to migrate around the edges of the separator 5 and come in contact with the anode 7. Isolation of the two compartments is essential for the cation exchange membrane to function effectively. A spring 4 can be used to maintain pressure along with a spacer 6.

Figure 2:
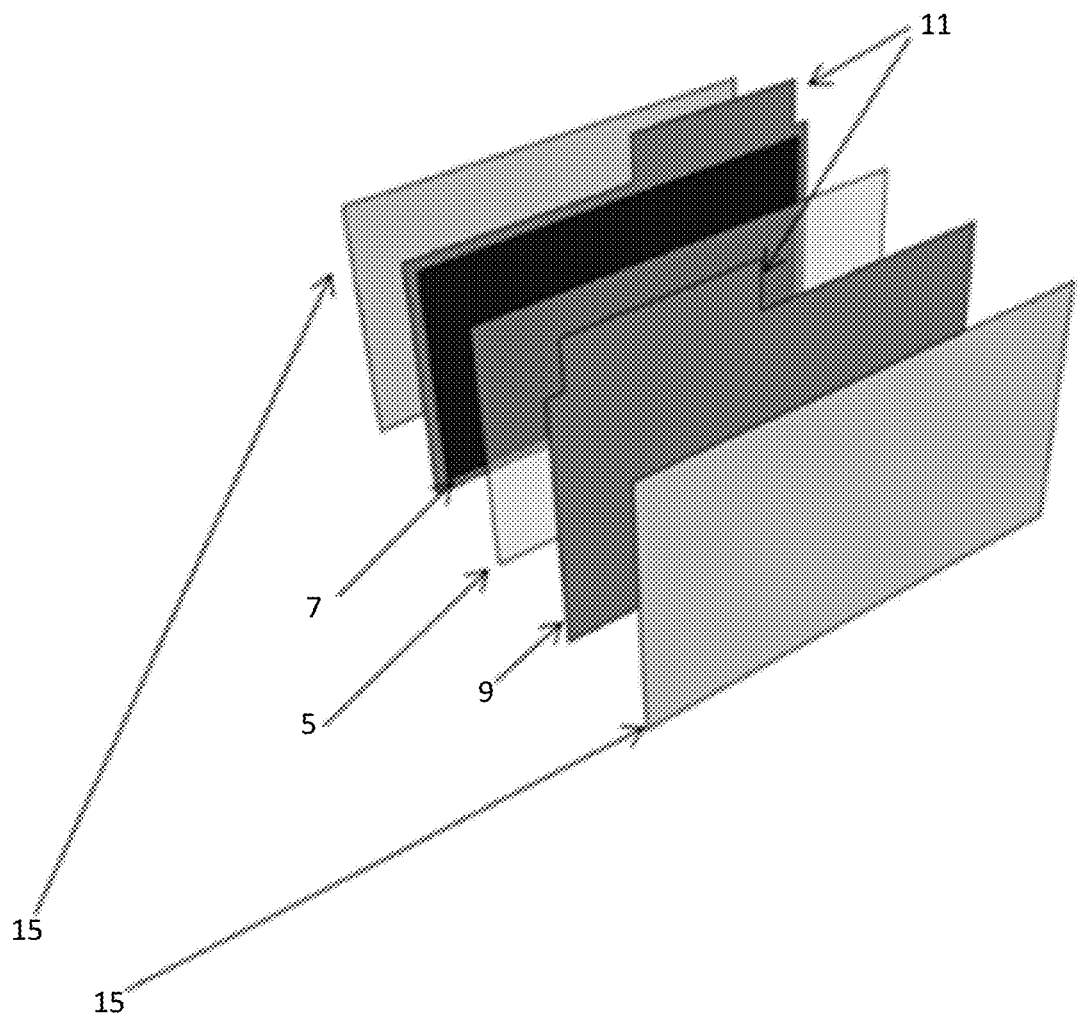
FIG. 2 is an exploded view of the components of a pouch cell battery.
Figure 3:
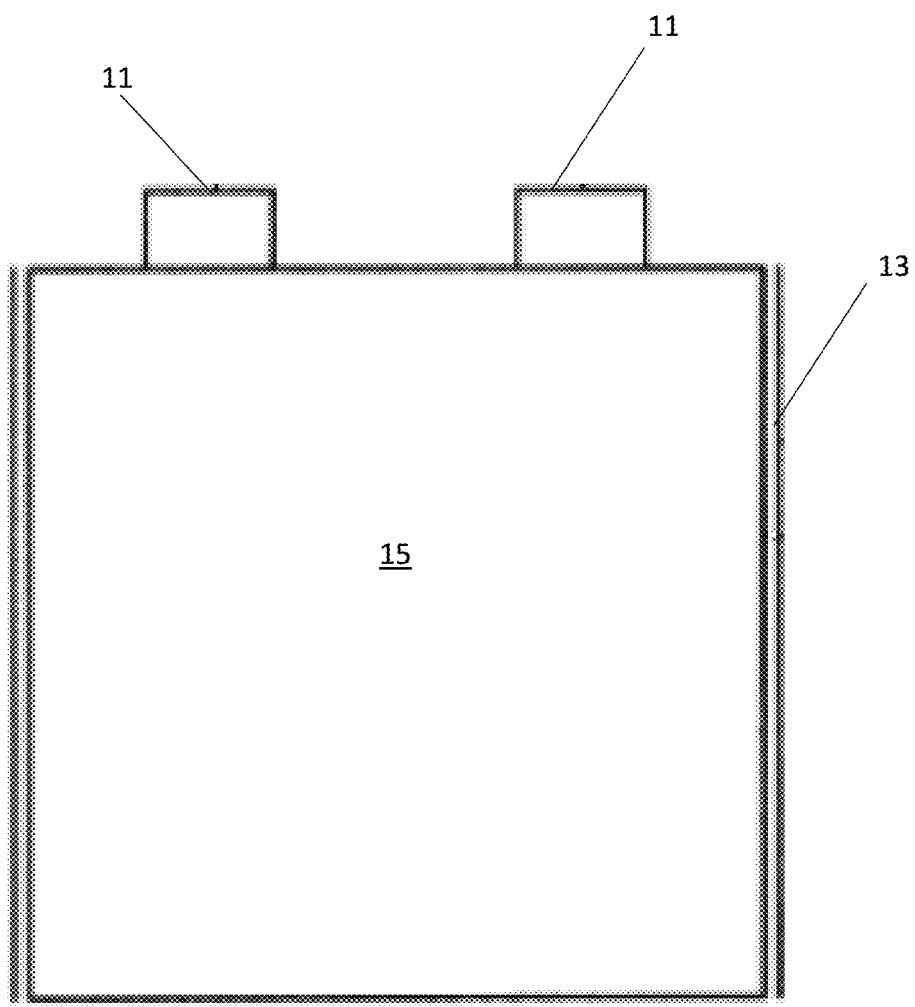
FIG. 3 is a view of a pouch cell battery using perimeter edge sealing techniques.

In one exemplary embodiment, the cation exchange membrane 5 can be used in a battery pouch configuration. In this embodiment, the cathode 9 compartment of the battery must be completely isolated from the anode 7 compartment. As shown in FIG. 2, a traditional battery pouch cell configuration, the complete isolation of the cathode 9 and anode 7 compartment is not possible due to the liquid electrolytes 19 ability to flow around the edges and come into contact with the anode 7. In these conventional pouch cells, the electrodes 11 and membranes 5 can be stacked and a final sealing can be applied around the perimeter edge 13 of the packaging material 15 as illustrated in FIG. 3. The sealing around the perimeter edges 11 of the packaging material do not effectively isolate the cathode 9 and anode 7 compartments inside the packaging, thereby allowing the soluble polysulfides generated in the cathode compartment to migrate around the edges of the cation exchange membrane 5 and react with the anode 7 rendering the membrane 5 functionally ineffective.

Figure 4A:
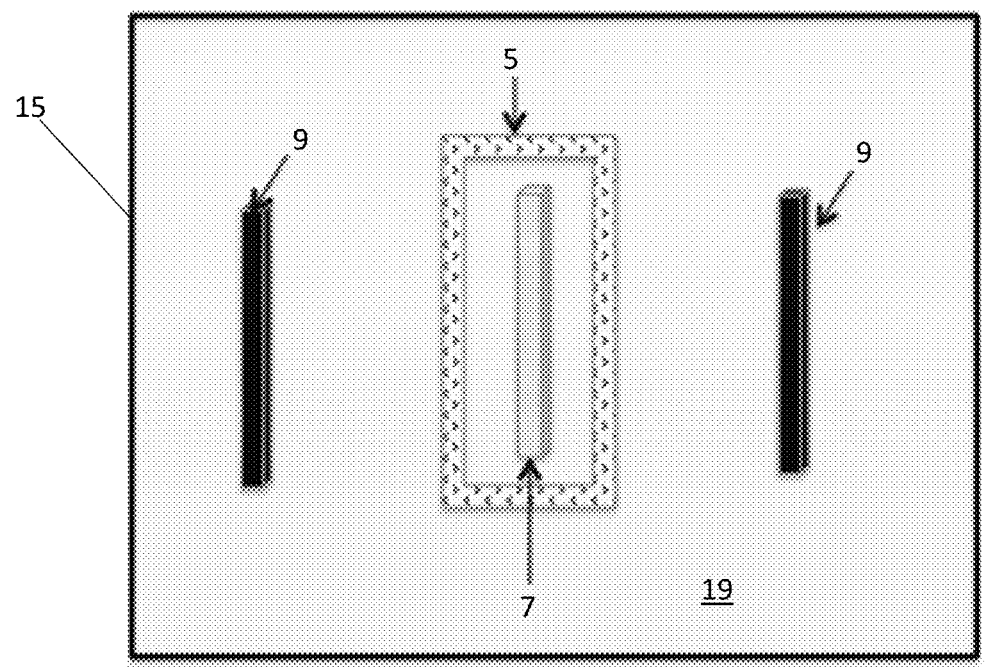
FIGS. 4A-B are schematics of an exemplary embodiment of a pouch cell battery including a cation exchange membrane of the present disclosure.
Figure 4B:
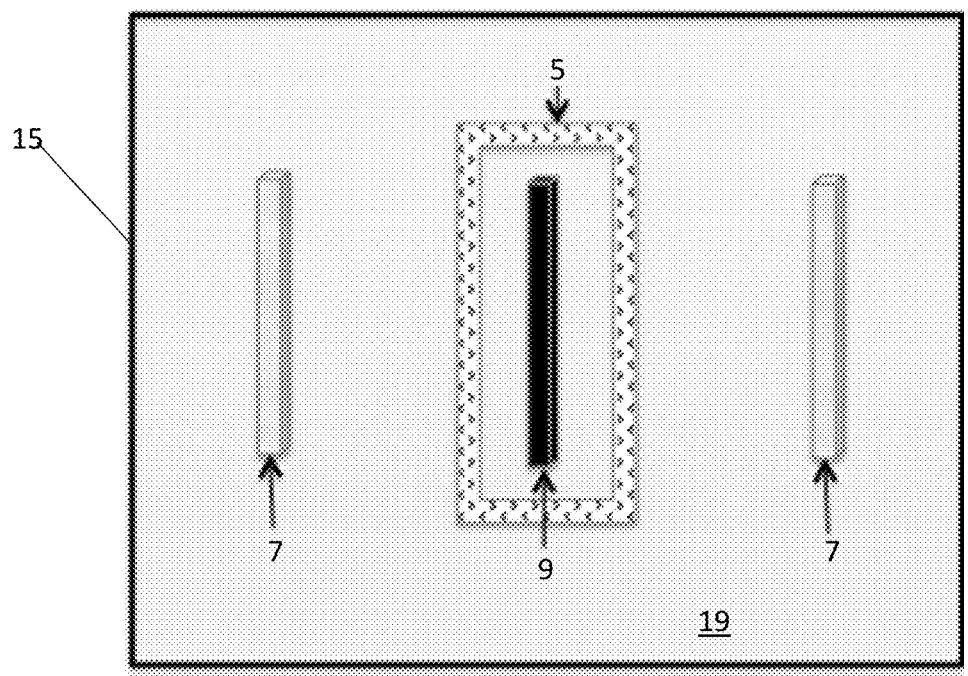
Figure 7:
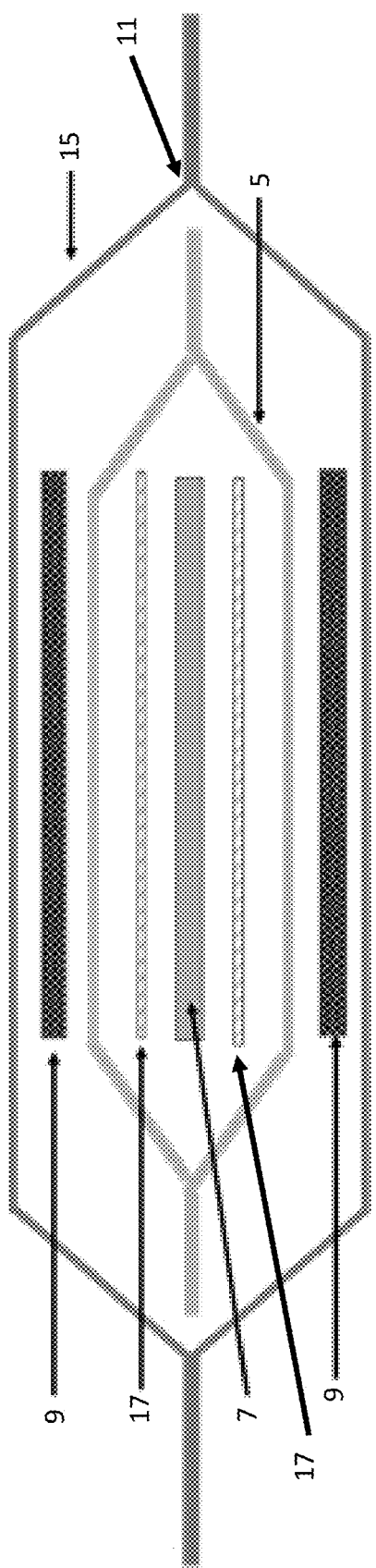
FIG. 7 is a cross-sectional view of an exemplary embodiment of a pouch cell battery of the present disclosure including an ion exchange membrane and a porous polypropylene separator within the ion exchange membrane.

One exemplary embodiment of pouch cell battery of the present disclosure can include a Li—S battery cell pouch having one or more sulfur cathodes 9, one or more lithium anodes 7 and at least one ion-exchange membrane 5. As shown in FIGS. 4 and 7, the ion exchange membrane 5 can completely surround at least one of the cathodes or anodes. In some exemplary embodiments, both the cathode 9 and anode 7 can be enclosed within the ion-exchange membrane 5. By encapsulating the cathode 9 or anode 7 within the membrane 5, the cathode 9 and anode 7 can be completely isolated from each other and inhibit and/or eliminate migration of soluble polysulfide anions from the cathode to the anode compartment of a battery pouch cell. In some exemplary embodiments, the ion-exchange membrane 5 can be perfluoroinated ion exchange membrane or a hydrocarbon-based ion exchange membrane, such as polystyrene sulfonic acid membrane. Similarly, the ion-exchange membrane 5 can be an ionomer thin film, composed from a copolymer of tetrafluoroethylene and perfluoro-vinyl-ether. In another exemplary embodiment, one or more cathodes can be encapsulated by a corresponding first ion exchange membrane and one or more anodes can be encapsulated by a second corresponding ion exchange membrane. The cathodes and anodes can also both include a separator coupled to one or more sides of the cathode and/or anode. Additionally, any suitable cathode or anode material can be use. In some exemplary embodiments, the battery can have a carbon-based cathode or a sulfur-based cathode.

In one exemplary embodiment, the ion exchange membrane 5 can include a porous support layer, preferably of a fluorine-containing polymer having a pore diameter of from about 0.01 to about 20 µm or between about 0.05 to 10 µm, and having a porosity of from about 50 to about 95% and a thickness of from about 10 to about 200 µm and/or (b) one or more polymeric ion exchange resins or polymer, preferably in the form of layers supported on either or both sides and preferably having a thickness less than about 250 µm and an equivalent weight of about 500 EW to about 2000 EW and preferably an ion exchange capacity of from 0.5 to 2.0 meq/g dry resin. In one exemplary embodiment, the ion exchange membrane 5 can be a composite membrane including a polymeric membrane portion and a porous support layer that can be used to reinforce the membrane. Other embodiment can include a bi-layer membrane that can be used as the ion exchange membrane. The polymeric ion exchange resin layers may be made from polymers known in the art such as sulfonated polystyrene or more preferably fluorinated polymers, preferably having sulfonyl or carboxyl ion exchange groups. The reinforced polymeric membrane reduces the crossover of ions in a battery, increases the mechanical strength of the membrane, and may provide an excellent combination of electrical properties including high voltage at a given current density, relatively low electrical resistance and good water management.

Figure 5A:
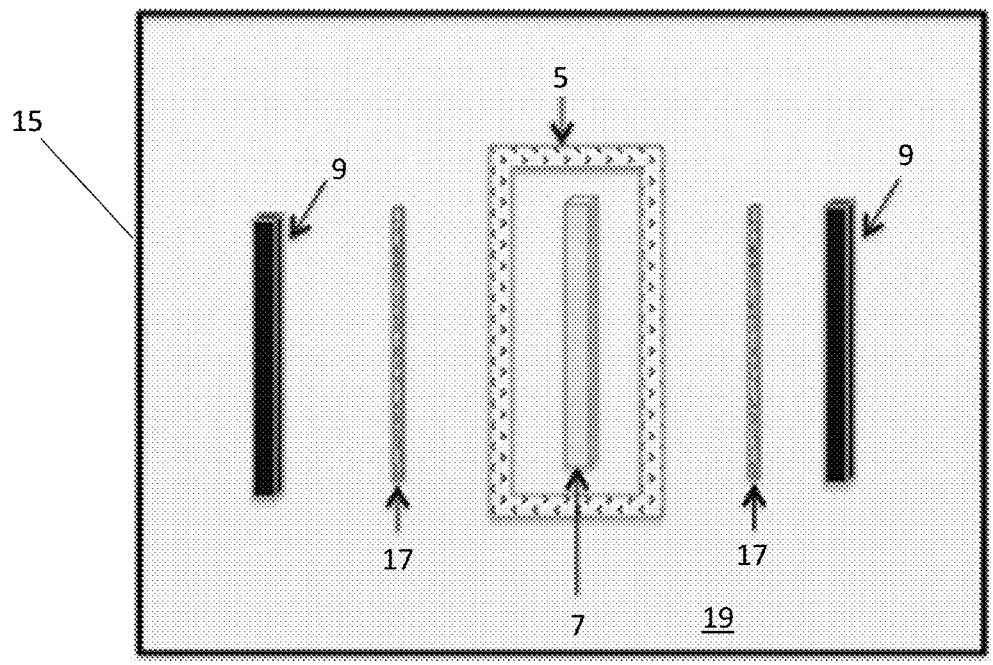
FIGS. 5A-B are schematics of an exemplary embodiment of a pouch cell battery including a cation exchange membrane of the present disclosure further including a porous polypropylene separator.
Figure 5B:
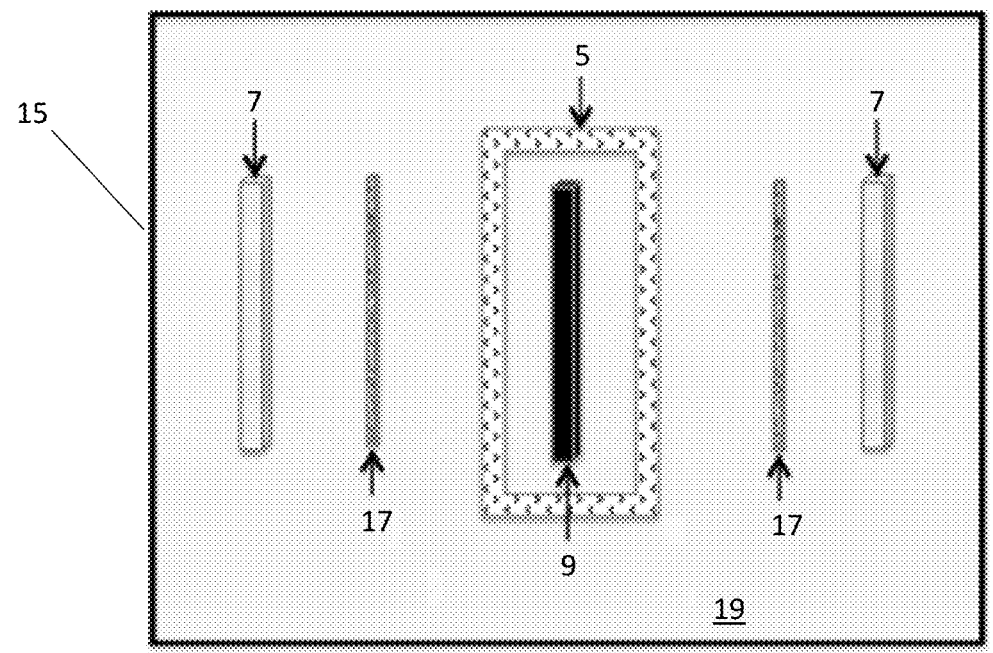

In another exemplary embodiment shown in FIG. 5, the Li—S battery cell can further include a porous separator 17. Traditionally, in coin cells a separator can isolate the anode from the cathode. However, in past pouch cell design the separator does not exist or does not adequately of functionally isolate the anode from the cathode, thereby allowing a polysulfide ion to go around separator due to the lack of sealing around the edge. Heat sealing pouch cell on all sides after wrapping in cation exchange membrane 3 prevents or inhibits polysulfide ions to go around the membrane 5. In one embodiment, a separator 17 can be applied or sealed around the lithium anode.

In one exemplary embodiment, the pouch cell 100 can require the following components: Dimethoxy ethane (DME, 99+%, Aldrich Chemicals), 1, 3-dioxolane (Anhydrous, contains 75 ppm BHT, Aldrich Chemicals), Lithium trifluoromethanesulfonate $LiCF_3SO_3$, 98%, Aldrich Chemicals), Lithium nitrate ($LiNO_3$, 99+%, Aldrich Chemicals), Sulphur Flakes (99.99%, Sigma-Aldrich), Graphene Oxide (GO, Graphenea Inc.) and lithium sulfide ($Li_2S$, 99.9%, Aldrich Chemicals) were purchased and used as received. Carbon nanofiber (CNF, Pyrograf Products Inc.). Titanium nitride (TiN) nano-particles (20 nm, US Research Nanomaterials Inc.) Nafion® 211 membrane was purchased from the Fuel Cell Stores, Carboxy Methyl Cellulose (250K CMC, Sigma-Aldrich), 50% by weight Styrene Butadiene Rubber Aqueous Solution (SBR, Sigma-Aldrich), Polypropylene Glycol (PG, Sigma-Aldrich), Multiwalled Carbon Nanotubes (MWCNT, Cheap Tubes.com) and Celgard 14 microns Porous Polypropylene Separator (PP Separator, MTI).

In one exemplary embodiment, a mixture of about 88% Sulfur, about 11% CNF and about 1% GO were heat treated at about 155° C. for about 12 hours. The heat-treated mixture was then combined with about 4% TiN, about 1% CMC and about 1% SBR and then an appropriate amount of CNF was added to bring the Sulfur content to 70% by weight followed by adding water to bring the solids content to about 350 mg/ml. The final mixture can then be converted into a slurry by high speed blending. The slurry can then be coated onto a carbon coated aluminum foil and dried to form a first layer and then a second layer of a slurry of propylene glycol and multiwalled carbon nano-tube (MWNT) can be cast on top of the first layer and then dried again forming a sulfur-based cathode. In another embodiment, a slurry of about 8 nm multiwalled carbon nano-tube (MWCNT) in PG slurry can be coated onto a carbon coated aluminum foil and dried to form a first layer and then a second layer of a slurry of about 10-13 um MWCNT can be cast on top of the first layer and then dried again forming a carbo-based cathode.

An electrolyte can be found within the pouch cell packaging material 15. Any suitable electrolyte may be used within the pouch cell. In one exemplary embodiment, the electrolyte was prepared by dissolving an appropriate amount of $LiCF_3SO_3$ and $LiNO_3$, $Li_2S_6$ and sulfur in a DME/DOL (1:1 volume ratio) mixture solvent to render a 1.0 M $LiCF_3SO_3$, 0.1 M $LiNO_3$, and 1.5 M Sulfur solution.

Any suitable packaging material 15 can be used to encapsulate and form the pouch cell battery. In one exemplary embodiment, the packaging material can be an aluminum foil material. In one exemplary embodiment, the pouch cell of the present invention can use a Nafion® membrane. The Nafion® membrane can be soaked in the electrolyte comprising 1.0 M $LiCF_3SO_3$ and 0.1 M $LiNO_3$ in the DME/DOL (1:1, volume ratio) solvent for about 7 days. The lithiated Nafion® membrane can then be used for cell assembly. The cathode and the anode electrodes had an active area of about 3 cm by 4 cm. In some embodiments, the same electrolyte can be used within the pouch cell battery.

Figure 6:
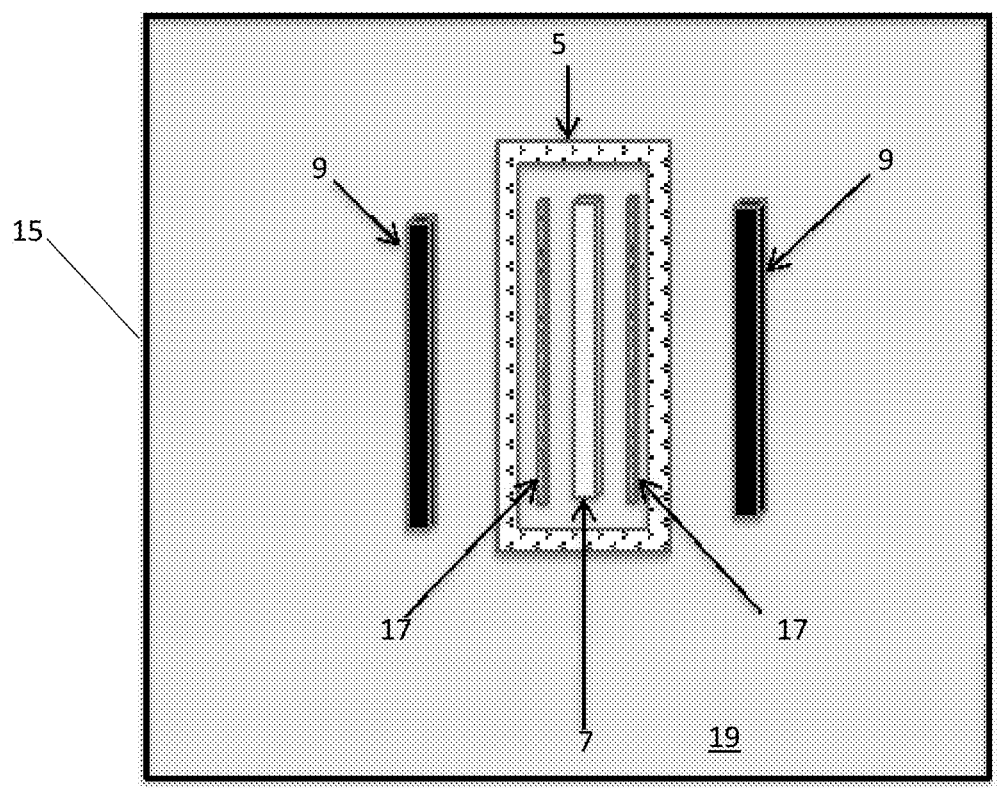
FIG. 6 is a schematic of an exemplary embodiment of a pouch cell battery including a cation exchange membrane of the present disclosure further including a porous polypropylene separator within the ion exchange membrane.

An anode 7, separator 17, membrane 5, and cathode 9 can then be assembled in a pouch cell packaging having configuration as shown in FIG. 6 and FIG. 7, within the packaging material. The pouch cell can be assembled in an Argon-filled glove box or other suitable dry room conditions. One embodiment can include a lithium-based anode 7, a porous polypropylene separator 17, a Nafion® membrane 5, and a sulfur-based cathode 9. Similarly, another embodiment can include a lithium-based cathode, a polypropylene separator, a Nafion® membrane, and a carbon-based anode. To prepare the pouch cell configuration, a membrane 5, such as a Nafion® NR211 bag, can first be prepared by sealing three sides and then the Lithium anode can be wrapped with a separator 17 and placed inside the membrane 5. Then the membrane 5 containing the anode, and the two cathodes can be placed within the pouch cell packaging 15 to assemble a pouch cell battery as shown in FIG. 7. An electrolyte can then be added to the pouch cell packaging 15 prior to the pouch cell being sealed. One or more electrodes 11 can be positioned to correspondence to the anode 7 and cathode 9 material. In one exemplary embodiment, about 1 ml of the electrolyte can be used in the pouch cell. This configuration creates a heat-sealed pouch cell on all sides after wrapping in cation exchange membrane, thereby sealing the separator around the lithium anode 7.

Figure 8:
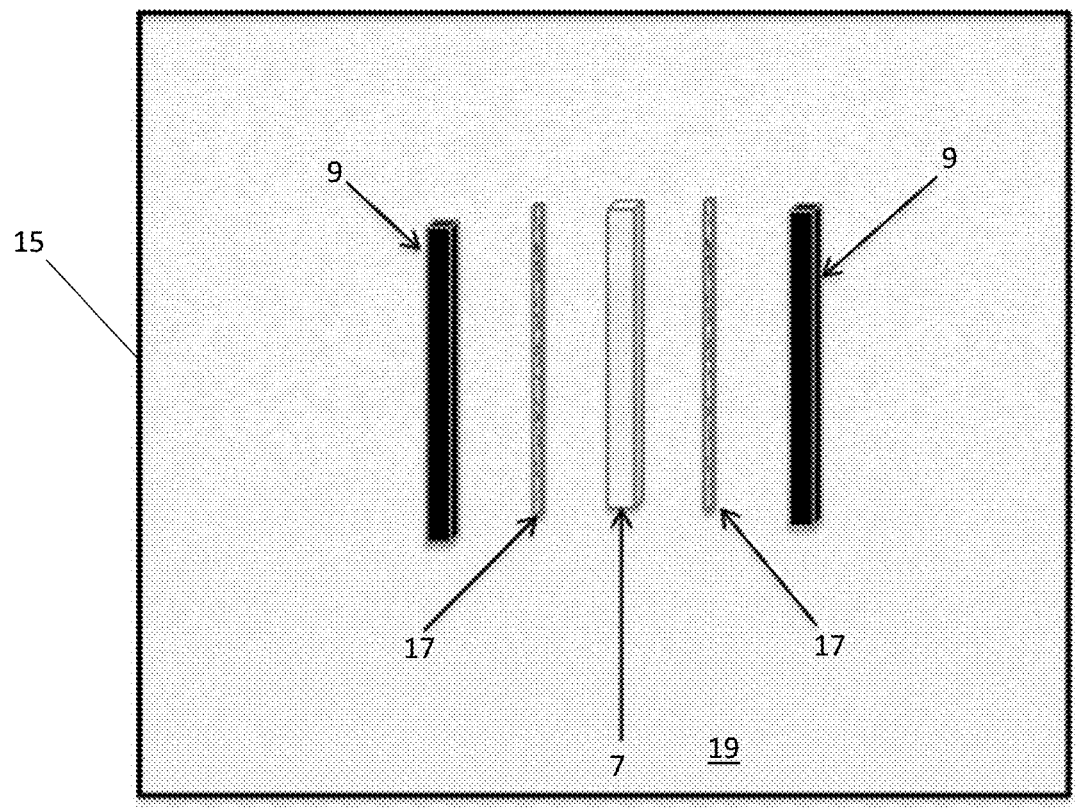
FIG. 8 is a schematic of a pouch cell battery including of the present disclosure further only including a porous polypropylene separator within the ion exchange membrane.
Figure 9:
FIG. 9 is a cross-sectional view of a pouch cell battery including of the present disclosure further only including a porous polypropylene separator within the ion exchange membrane.
Figure 10:
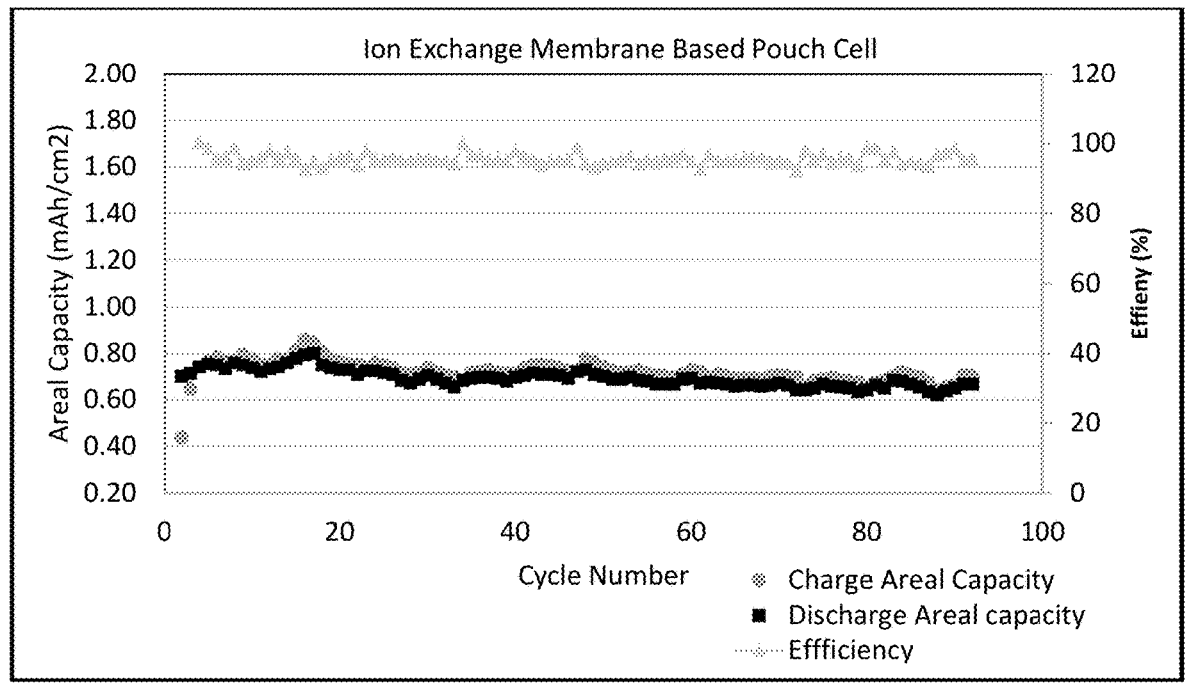
FIG. 10 is a charge-discharge graph profile of an exemplary embodiment of a pouch cell battery utilizing an ion exchange membrane and separator with a sulfur-based cathode.
Figure 11:
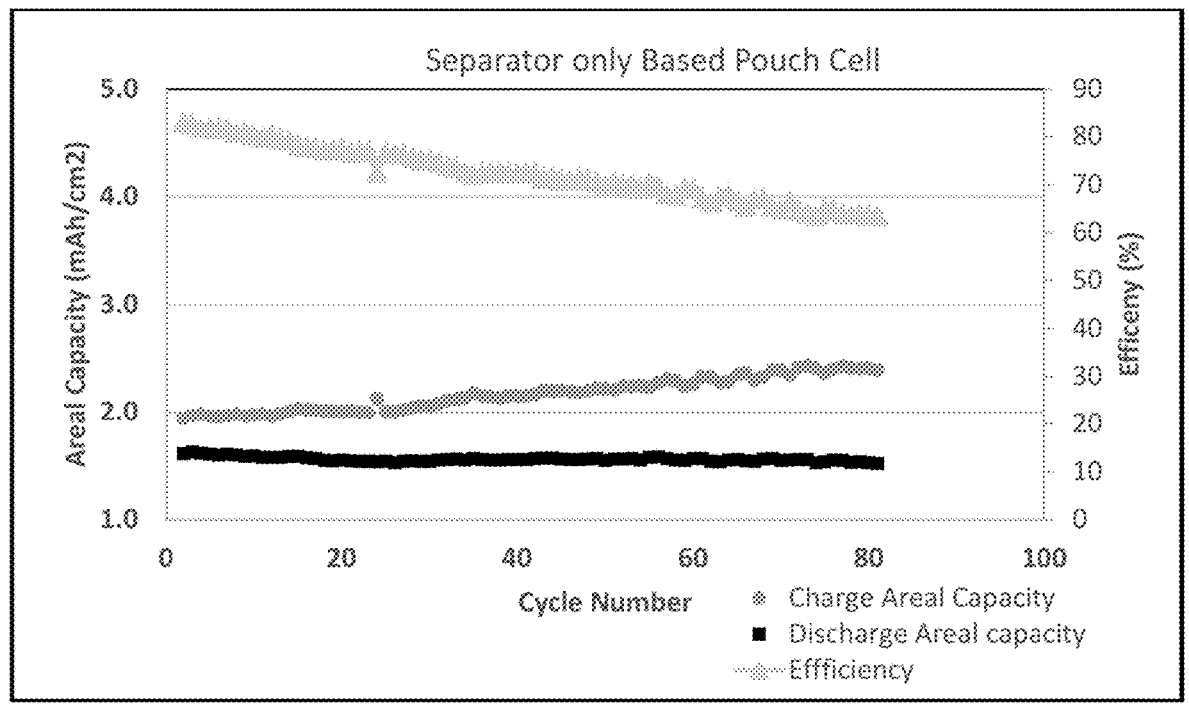
FIG. 11 is a charge-discharge graph profile of an exemplary embodiment of a pouch cell battery utilizing only separator with a sulfur-based cathode.

In a first example, the performance of a pouch cell with only polypropylene separator using similar carbon-based cathode, anode and electrolyte having a configuration shown FIG. 8 and FIG. 9. is compared with ion exchange membrane-based pouch cell having configuration shown in FIG. 6 and FIG. 7. The ion exchange membrane-based pouch cells utilized a Nafion® membrane. The cells were first discharged and then a number of charge-discharge cycles were run to form the cell. After the formation step the cells were operated for cycle life test where the charge-discharge cycles were run at 100% depth of discharge and at a charging rate of C/5 and discharging rate of C/3. FIG. 10 and FIG. 11 compares the cycle life performance of pouch cell battery having a sulfur cathode utilizing a Nafion® membrane with polypropylene (PP) separator-based cell respectively, showing that both the discharge capacity and efficiency of the PP separator-based cell is decreasing with increasing cycle number whereas the for the Nafion® membrane-based cell both the discharge capacity and the efficiency remains essentially unchanged over similar number of cycles.

Figure 12:
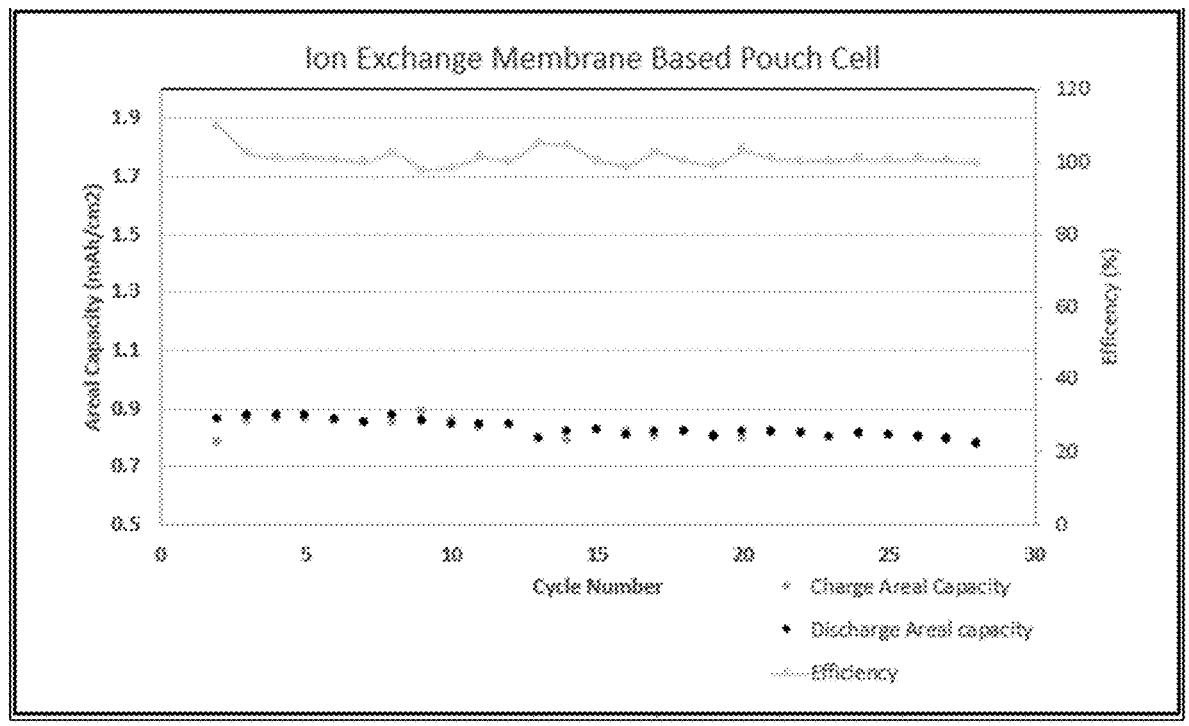
FIG. 12 is a charge-discharge graph profile of an exemplary embodiment of a pouch cell battery utilizing an ion exchange membrane and separator with a carbon-based cathode.
Figure 13:
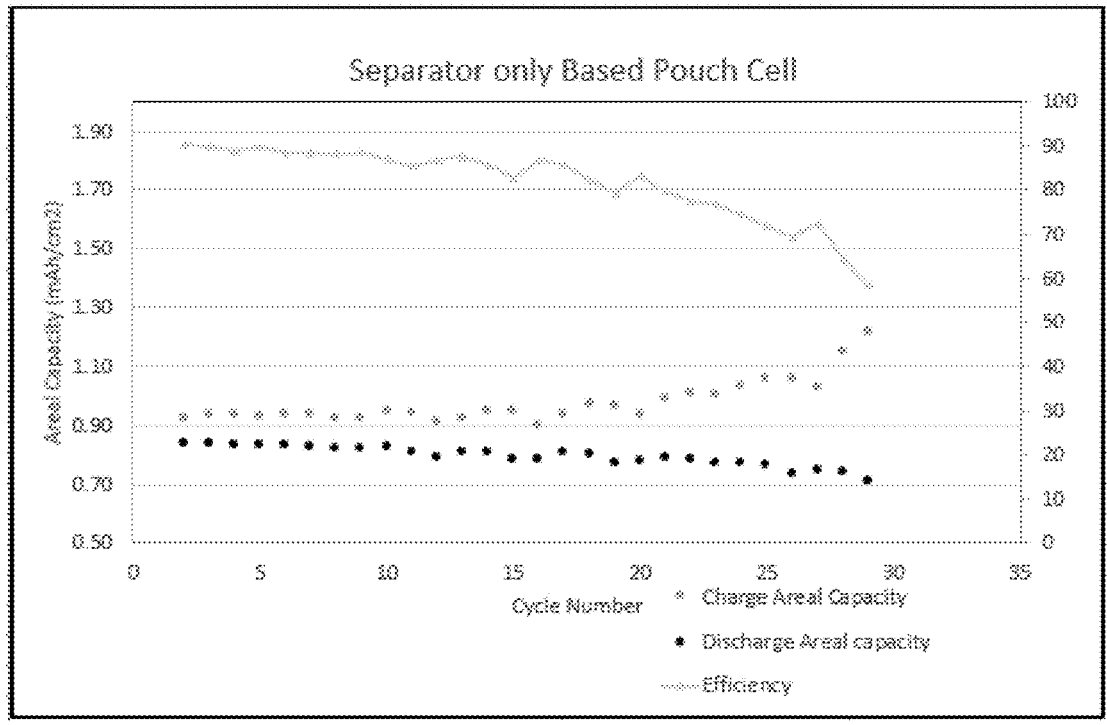
FIG. 13 is a charge-discharge graph profile of an exemplary embodiment of a pouch cell battery utilizing only a separator with a carbon-based cathode.

In another example, two pouch cells with carbon-based cathodes were assembled and tested. The cells were first discharged and then a number of charge-discharge cycles were run to form the cell. After the formation step the cells were operated for cycle life step where the charge-discharge cycles were run at 100% depth of discharge and at a charging rate of C/5 and discharging rate of C/3. FIG. 12 and FIG. 13 compares the cycle life performance of Nafion® separator-based cell with polypropylene (PP) separator-based cell respectively, showing that both the discharge capacity and efficiency of the PP separator-based cell is decreasing with increasing cycle number whereas the for the Nafion® membrane-based cell both the discharge capacity and the efficiency remains essentially unchanged over similar number of cycles.

While the invention has been described above in terms of specific embodiments, it is to be understood that the invention is not limited to these disclosed embodiments. Upon reading the teachings of this disclosure many modifications and other embodiments of the invention will come to mind of those skilled in the art to which this invention pertains, and which are intended to be and are covered by both this disclosure and the appended claims. It is indeed intended that the scope of the invention should be determined by proper interpretation and construction of the appended claims and their legal equivalents, as understood by those of skill in the art relying upon the disclosure in this specification and the attached drawings.

What is claimed is:

1. A battery comprising:
   a cathode;
   an anode;
   an ion exchange membrane encapsulating either the cathode or the anode;
   a porous separator positioned between the cathode and the anode, and
   an electrolyte.

2. The battery of claim 1, wherein the battery is configured in a pouch cell configuration.

3. The battery of claim 2, wherein the cathode structure is completely encapsulated with the ion exchange membrane, wherein said ion exchange membrane is configured to inhibit migration of anions to and from the cathode.

4. The battery of claim 3, wherein the anode structure is completely encapsulated within the ion exchange membrane, wherein said ion exchange membrane is configured to inhibit migration of anions from the cathode.

5. The battery of claim 1, wherein the porous separator is positioned between the anode and the ion exchange membrane encapsulating the anode.

6. The battery of claim 1, wherein the porous separator is positioned between the cathode and ion exchange membrane encapsulating the cathode.

7. The battery of claim 5, wherein the ion exchange membrane further includes a porous support layer comprised of a fluorine-containing polymer having a pore diameter between 0.01 to 20 μm.

8. The battery of claim 7, further comprising a polymeric ion exchange resin, wherein the polymeric ion exchange resin is configured to reduce the crossover of ions.

9. The battery of claim 7, wherein the porosity of the support layer is between about 50 and 95% porous.

10. A method of manufacturing a pouch cell battery configured to improve stability:
    preparing a pouch cell packaging having four edges, wherein three of the four edges of the bag are sealed;
    preparing a first cathode;
    preparing an electrolyte;
    preparing a first anode;
    providing an ion exchange membrane;
    providing a separator configured to couple to the anode;
    placing the first anode having a separator within the ion exchange membrane;
    sealing said ion exchange membrane;
    placing the cathode, electrolyte, and the ion exchange membrane containing the anode within the pouch cell packaging;
    sealing the fourth edge of the packaging.

11. The method of claim 10, wherein the separator is a porous polypropylene separator.

12. The method of claim 11, wherein the cathode includes sulfur and the anode include lithium.

13. The method of claim 10, wherein the ion exchange membrane is an ionomer thin film and further includes a porous support layer comprised of a fluorine-containing polymer having a pore diameter between 0.01 to 20 μm.

14. A pouch cell battery comprising:
    a cathode containing sulfur;
    an anode containing lithium;
    a separator positioned between the anode and cathode;
    an ion exchange membrane configured to inhibit the crossover of ions in the battery, wherein the anode is fully encapsulated within the ion exchange membrane;
    an electrolyte;
    pouch cell packaging material configured to house the cathode, anode, separator, ion exchange membrane, and electrolyte;
    and
    a first electrode communicatively coupled to the cathode and a second electrode communicatively coupled to the anode.

15. The pouch cell battery of claim 14, wherein the separator is a porous polypropylene separator located between the anode and the ion exchange membrane.

16. The pouch cell battery of claim 14, wherein the ion exchange membrane is an ionomer thin film and further includes a porous support layer comprised of a fluorine-containing polymer having a pore diameter between 0.01 to 20 μm.

17. The pouch cell battery of claim 14, wherein the ion exchange membrane is composite membrane including a polymeric membrane portion and a porous support layer configured to reinforce the membrane.

18. The pouch cell battery of claim 14, wherein the electrolyte is comprised of $LiCF_3SO_3$ and $LiNO_3$.

* * * * *